Oct. 26, 1948.　　　F. E. MUNSCHAUER ET AL　　　2,452,525
SHEAR

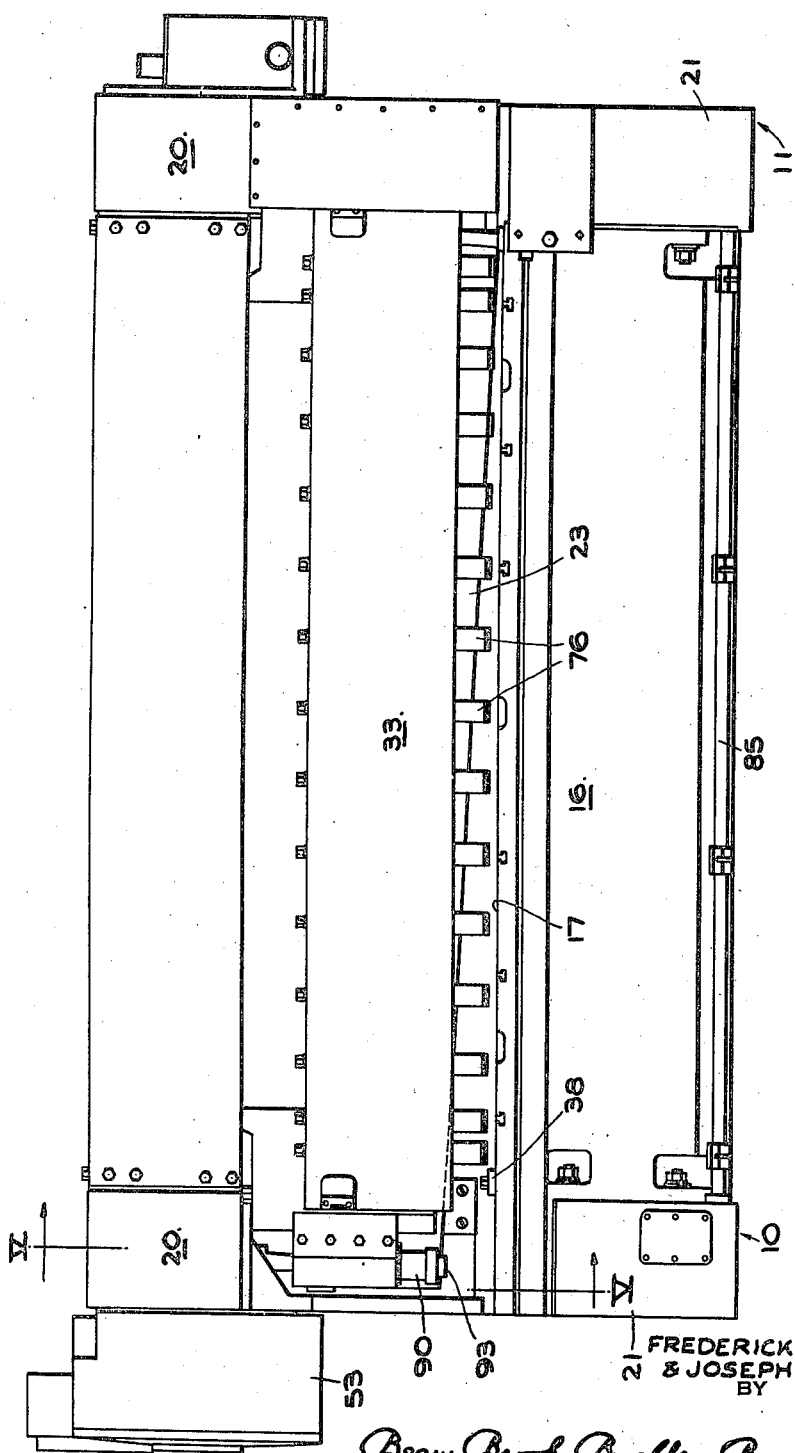

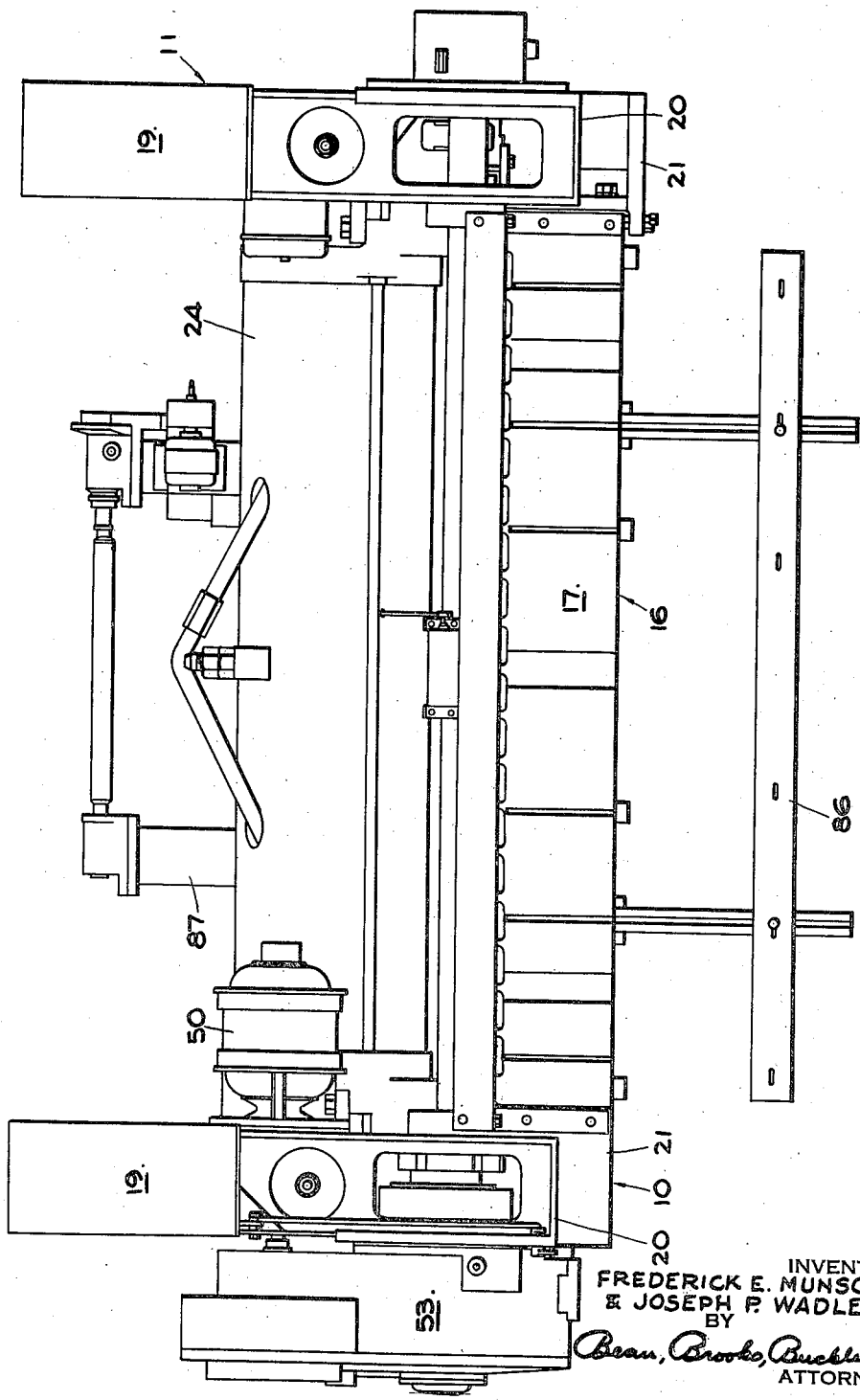

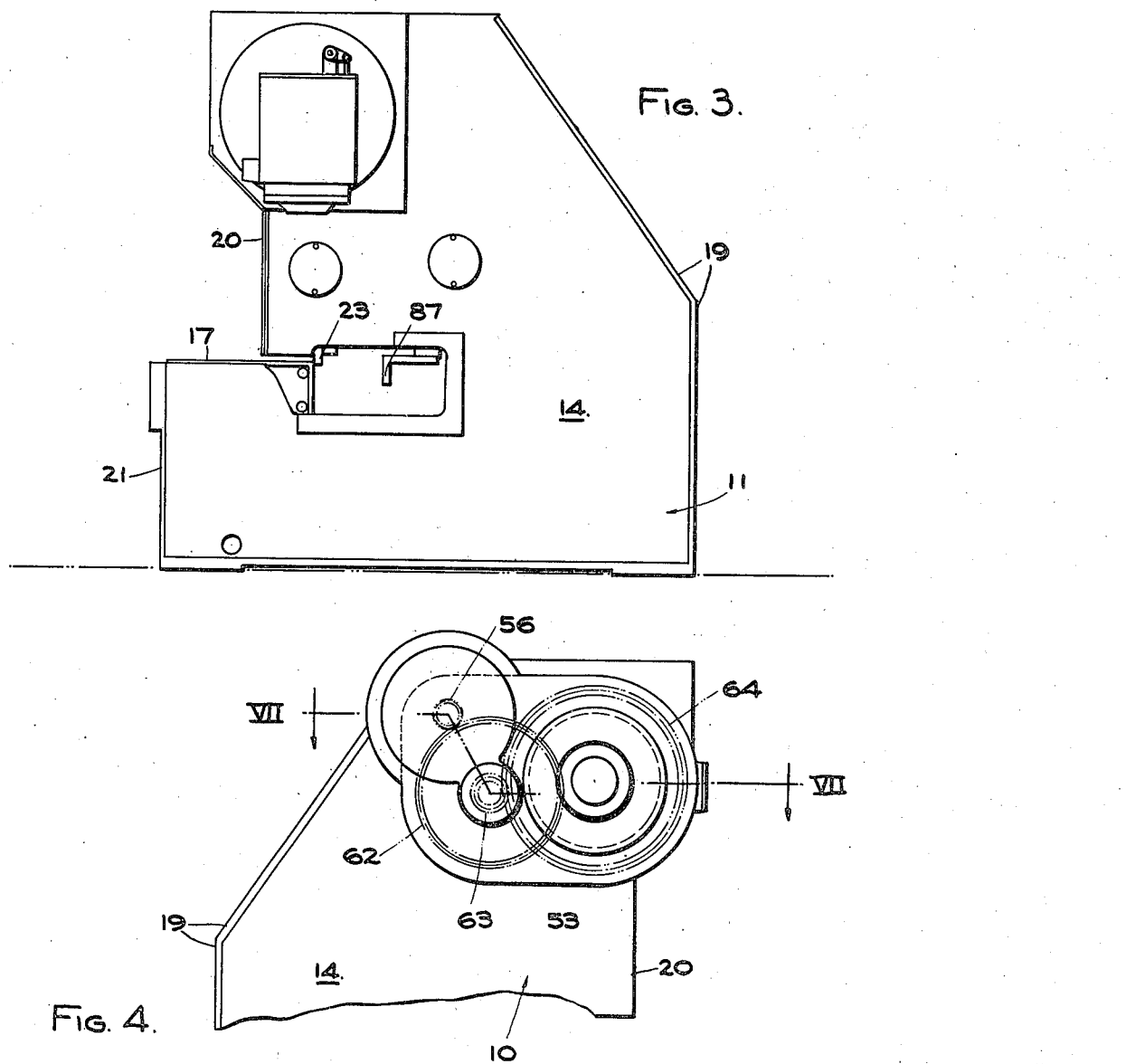

Filed May 3, 1945　　　　　　　　　　　　　　　6 Sheets-Sheet 4

INVENTORS
FREDERICK E. MUNSCHAUER
& JOSEPH P. WADLECK
BY
Bean, Brooks, Buckley & Bean
ATTORNEYS Oct. 26, 1948.  F. E. MUNSCHAUER ET AL  2,452,525
SHEAR
Filed May 3, 1945  6 Sheets-Sheet 6

INVENTORS
FREDERICK E. MUNSCHAUER
& JOSEPH P. WADLECK
BY
Bean, Brooks, Buckley & Bean. ATTORNEYS Patented Oct. 26, 1948

2,452,525

UNITED STATES PATENT OFFICE 2,452,525

SHEAR

Frederick E. Munschauer, Buffalo, and Joseph P. Wadleck, Kenmore, N. Y., assignors to Niagara Machine & Tool Works, Buffalo, N. Y.

Application May 3, 1945, Serial No. 591,698

15 Claims. (Cl. 164—51)

This invention relates to a power shear and particularly to a novel shear construction of the relatively heavy and rigid class employed in cutting metal and similar materials.

According to the present invention, the structural elements of the machine framework are arranged in a novel manner, whereby the loads and stresses are distributed in a highly advantageous and efficient manner. In addition, the novel arrangement of the working parts of the machine is such that the work of the machine is accomplished in a more efficient manner than in conventional shears of the prior art. Further, the arrangement of the shear of the present invention lends itself to economy of production and facility of assembly and disassembly.

The shear of the present invention is so arranged that the bearing loads of the main shaft and also of the motor shaft and the intermediate drive therebetween are distributed in a much more uniform and efficient manner than has heretofore been the case in shears of the general design here in contemplation, namely, shears of kind having a continuous open gap in the direction of extent of the shear knives.

A further advantage of the shear of the present invention is found in a novel arrangement of the shear knives whereby the machine may be readily and interchangeably used for full shearing cuts or for slitting, without preliminary adjustment or rearrangement of the shear knives. This advantage is further enhanced, in the machine disclosed herein, by the provision of auxiliary holddown means arranged to automatically engage a work piece during slitting operation of the shear in such manner as to securely hold it against shifting in the immediate region of the end of the slitting cut. In a modified form of shear knife arrangement shown herein, the advantage of the present slitting arrangement is extended to include any sheet gauge or shear angle that is otherwise within the capacity and limits of design of the shear.

In conventional gap shears, where the main operating shaft of the machine extends over the top of the crosshead between the side frame members, the exertion of shearing force by the shaft, usually through cranks or eccentrics, results in a high flexural stress in the shaft which is transmitted to the side frames of the machine as a force having a substantial lateral deflecting component. It is accordingly usually necessary to provide a crown of very substantial structural strength for connecting the upper portions of the opposite side frames. According to the construction here proposed, the upward thrust which the crosshead reaction imparts to the main shaft is absorbed in the side frame members as simple axial strains, because of the manner in which the side frames are constructed and arranged. No rigid structural element need accordingly be provided to prevent lateral deflection of the upper portions of the side frames of the machine. In the form set forth herein by way of example, a superficial housing connection is shown extending between the upper ends of the side frames, but this member is not comparable to the usual massive crown found in high capacity power shears of the type here under consideration.

Other advantages resulting from pursuance of the principles underlying the present invention will appear to those skilled in the art from a study of the drawings and the ensuing description. While a full and complete embodiment of the present invention is set forth by way of example, it is to be understood that the invention is not limited thereto or otherwise than as defined in the appended claims.

In the drawings:

Fig. 1 is an elevational view of one form of the machine of the present invention viewed from the front or operator's side of the machine;

Fig. 2 is a top plan view of the machine of Fig. 1;

Fig. 3 is an end elevational view taken from the right-hand end of the machine of Figs. 1 and 2;

Fig. 4 is a fragmentary end elevational view taken from the left-hand end of the machine;

Figure 5:
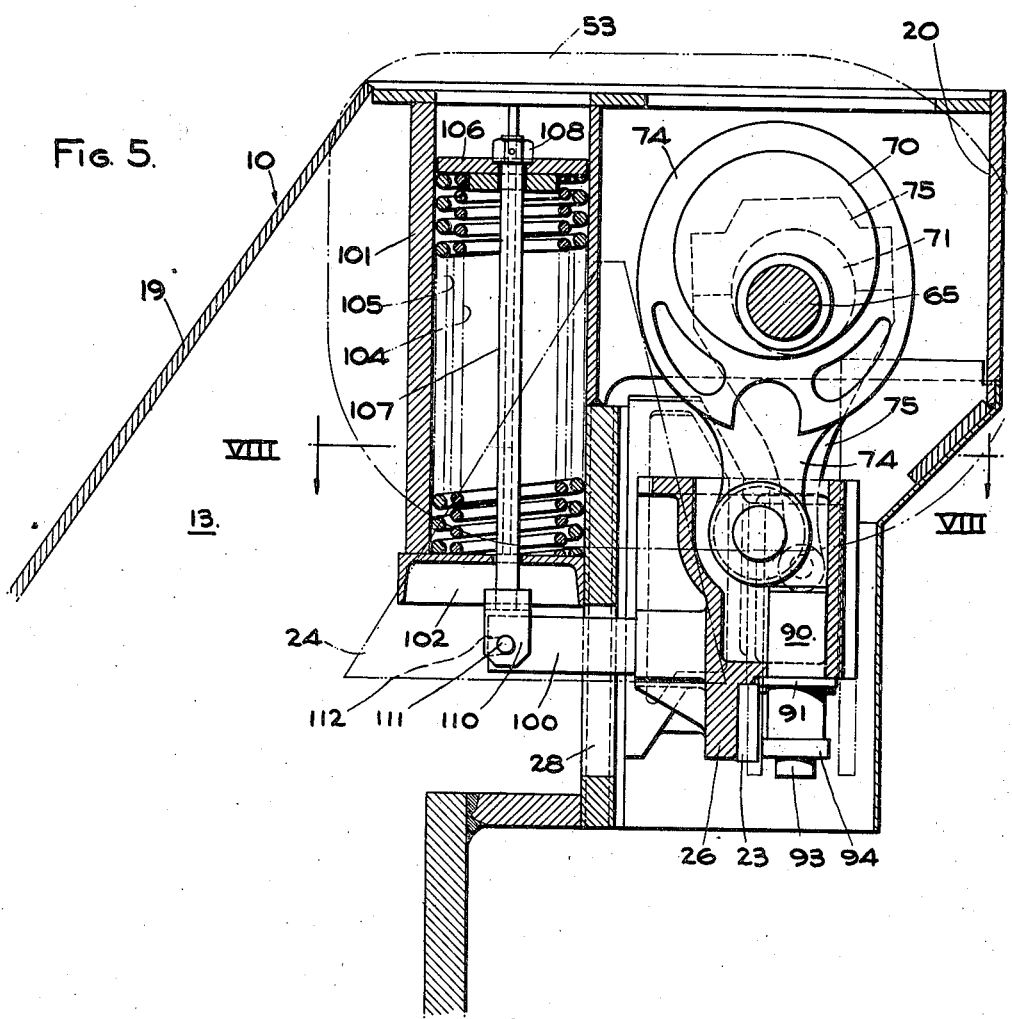
Fig. 5 is a transverse cross-sectional view taken on the line V—V of Fig. 1.

Throughout the several figures of the drawings, like character of reference denote like parts and the numerals 10 and 11 designate generally a pair of opposite side frame members or pedestals for the machine. Each of the side frame members comprises laterally spaced inner and outer wall portions 13 and 14, respectively, and, as is shown in Fig. 3, the wall portions are formed to provide an unobstructed work-receiving gap. The side frame members are rigidly connected by a bed 16 which includes a work-receiving table 17. The inner and outer walls, 13 and 14 of each of the side frame members are connected by rigid back wall portions 19 and upper and lower front wall portions 20 and 21. The various plate elements making up the side frames may be permanently connected by welding to form unitary side frame members.

The lower stationary shear knife (not shown in detail) is secured to the bed 16 at the rear edge of work-receiving table 17 in an entirely conventional manner. An upper shear knife designated 23 is carried by a crosshead 24 which is vertically reciprocable along guides associated with the inner and outer walls 13 and 14 of each of the side frames 10 and 11. A left-hand end casting of the crosshead 24 is designated 26 in Fig. 5 and a suitable opening is formed in each of the inner walls 13 of the frame members 10 and 11 to permit the end castings of the crosshead to pass freely therethrough.

Figure 8:
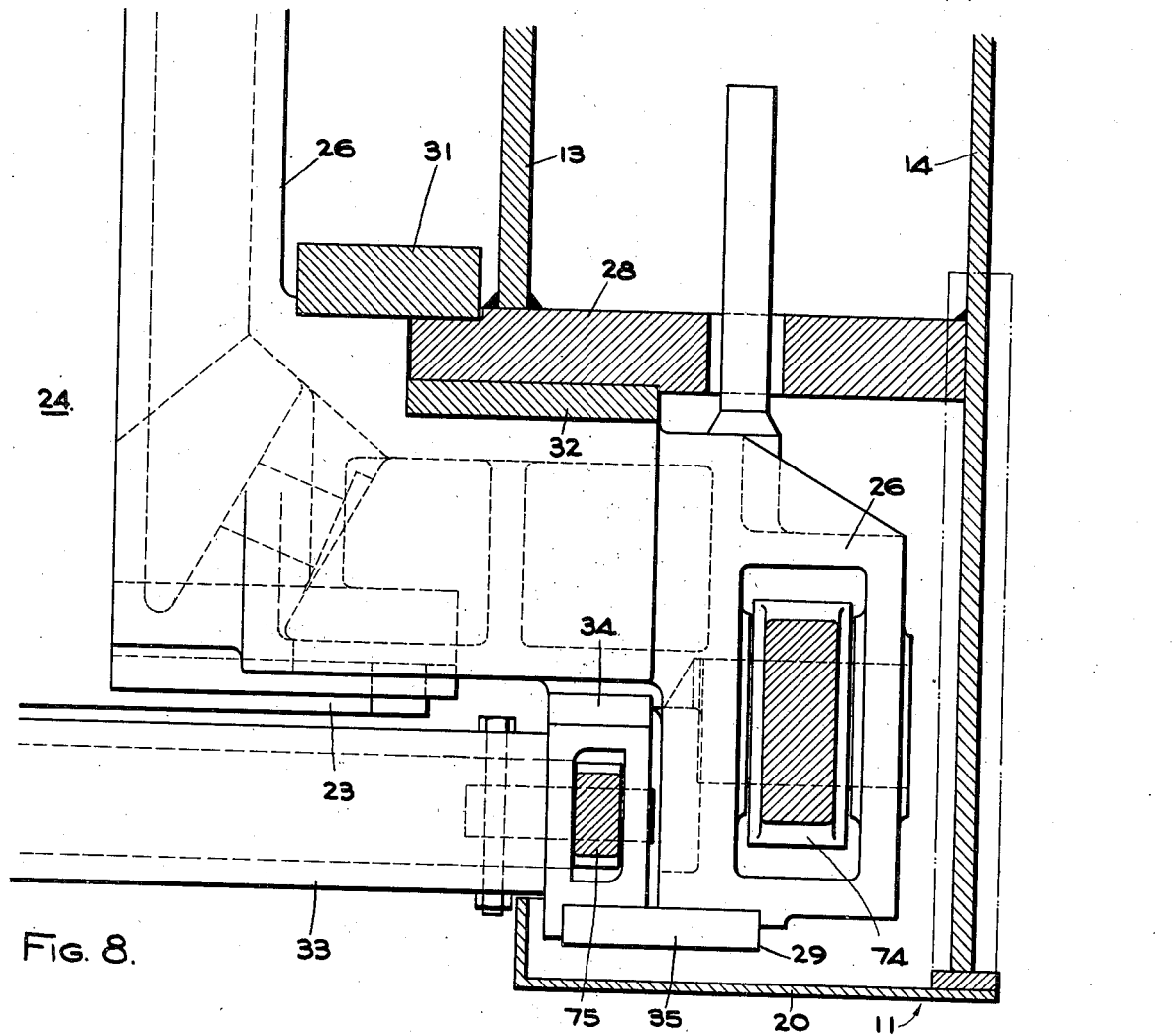
Fig. 8 is a fragmentary cross-sectional view on the line VIII—VIII of Fig. 5.

Referring particularly to Fig. 8 which shows the right-hand frame member 11, each end member 26 of the crosshead is formed to slidably engage a vertical guide member 28 which is rigidly associated with the corresponding unitary side frame member in any desired manner. In Fig. 8 the guiding formation on the member 26 are designated 31 and 32. As also appears from Fig. 8, a holddown 33 which extends from side to side of the shear has its ends guided for vertical sliding movement between guides 34 and 35 formed upon the end members 26 of the crosshead.

It will be noted from a consideration of Fig. 1 that the upper movable shear knife 23 extends to the left to occupy the major portion of the gap between the upper and lower parts of the lefthand side frame 10. Similarly, the lower shear knife extends into and along the gap in frame 10. The relative setting of the upper and lower shear knives is such that, when the upper knife has fully descended, the cutting edges of the upper and lower knives intersect within the confines of the gap of frame 10, so that they may be employed in slitting, as distinguished from complete shearing.

In the arrangement of the shear of the present invention, conventional full shearing cuts are made wholly between the side frames 10 and 11. A left-hand side gauge is designated 38 in Fig. 1 and this gauge is normally in fixed position. However, when it is desired to slit sheets which are of greater lineal dimension than the normal full shearing capacity of the machine, the gauge 38 is temporarily removed and sheets may then be placed on the table 17 extending off to the left as viewed in Figs. 1 and 2, and they may thus be progressively slit.

Figure 7:
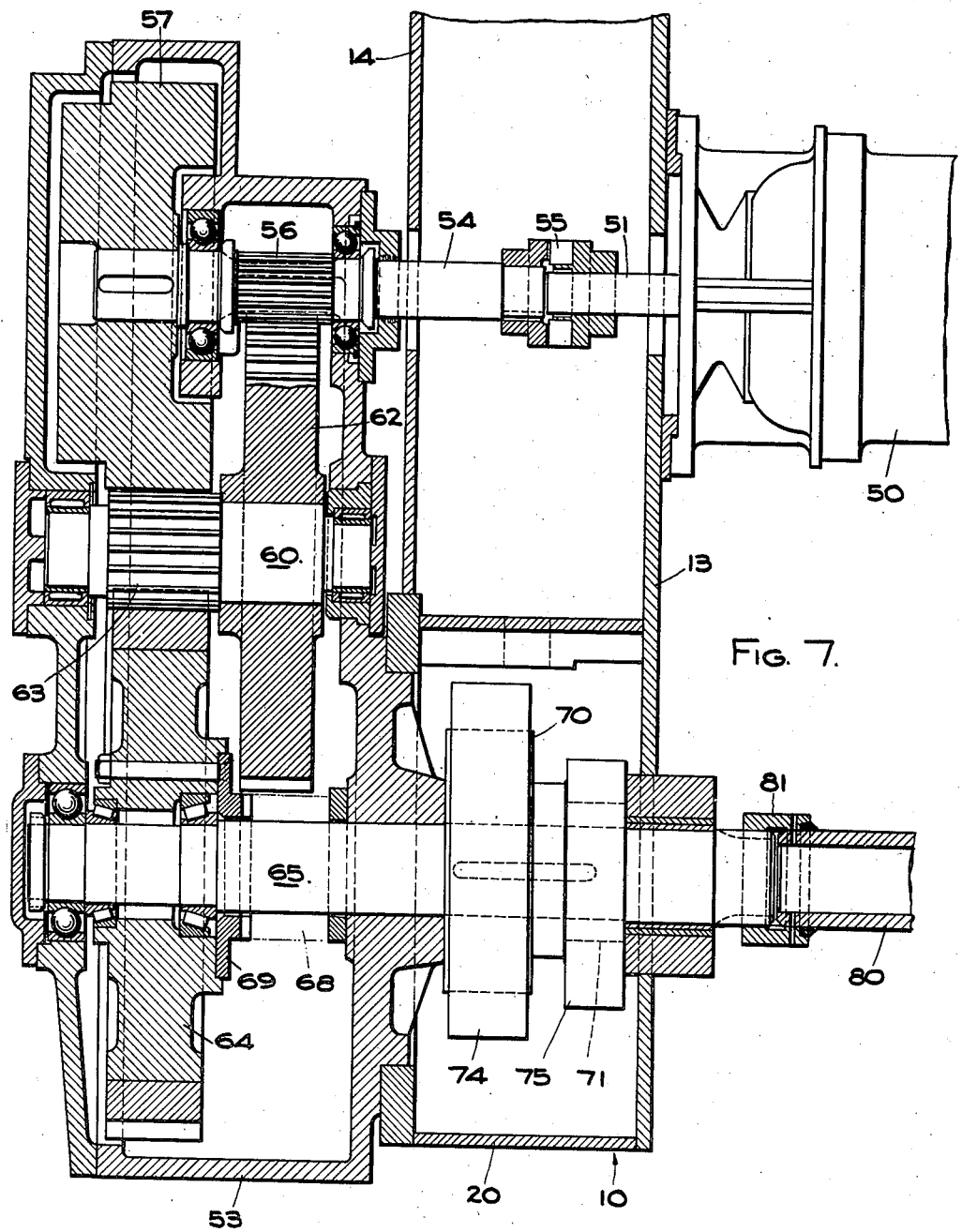
Fig. 7 is a fragmentary cross-sectional view on the line VII—VII of Fig. 4.

The drive means for reciprocating the crosshead and the holddown and its arrangement will now be described, and in this connection special reference will be had to Figs. 5, 7, and 8. In Fig. 7 the left-hand side frame 10 is shown in crosssectional plan and the numeral 50 designates an electric driving motor for the shear mounted against inner wall 13 of frame 10, its drive shaft 51 extending between walls 13 and 14.

A transmission casing 53 is secured against the outer wall 14 of frame 10 and a shaft 54 journaled therein likewise extends into the space between walls 13 and 14 where a jaw coupling 55 connects it with motor shaft 51. Shaft 54 includes a drive pinion 56 and carries a flywheel 57. An intermediate shaft 60, likewise journaled in casing 53, carries a gear 62 which meshes with pinion 56 and also includes a pinion 63 which meshes with gear 64 which is supported for free relative rotation on a shaft element 65 which is in turn journaled for free rotation in the casing 53 and also in the walls of the frame 10.

The gear 64, while it has anti-friction bearing engagement with shaft element 65, is adapted to be coupled therewith for effecting shearing strokes by means of a conventional single-revolution clutch which is well known in the art and is indicated schematically at 68 in Fig. 7. One of the jaw clutch elements is shown bolted to gear 64 and is designated 69 in Fig. 7. The other jaw clutch element (not shown) is axially movable on shaft 65 for engagement and disengagement and is fixed for rotation with the shaft element, all in the usual conventional manner.

Within the frame element 10 shaft element 65 is provided with crosshead and holddown reciprocating means in the form of eccentrics 70 and 71 which, by way of example, are formed as a unit and keyed to shaft element 65. The eccentrics 70 and 71 are provided respectively, with connections 74 and 75 which extend downwardly into pivotal engagement with the crosshead and the holddown, respectively, as shows best in Figs. 5 and 8.

The holddown eccentric 71 is timed to lower the holddown ahead of the crosshead eccentric. The bottom dead center position of the holddown is reached when the upper shear knife is about twothirds through the shearing operation, which is found to be the time at which the greatest holding force is required. The construction and operation of the yieldable holddown feet 76 which appear in Fig. 1 are entirely conventional and need not be further described.

The right-hand frame 11 is provided with a shaft element (not shown) which corresponds with the portion of the shaft element 65 disposed within left-hand frame 10 and, like shaft element 65, it is provided with duplicate eccentric and connection means for the crosshead and holddown. The inner end of shaft element 65 and the corresponding inner end of the right-hand shaft element are connected for joint rotation by means of a tube 80 whose ends have welded or otherwise secured thereto internally splined collars 81 which engage over complementary splines formed at the inner ends of the two shaft elements.

An operating treadle shaft is designated 85 in Fig. 1 and the connection between it and the single-revolution clutch 68 is entirely conventional and need not be illustrated or described. Front and back gauge arrangements are designated generally at 86 and 87, respectively, in Fig. 2 and these devices are likewise of a kind conventional in the present art.

Figure 6:
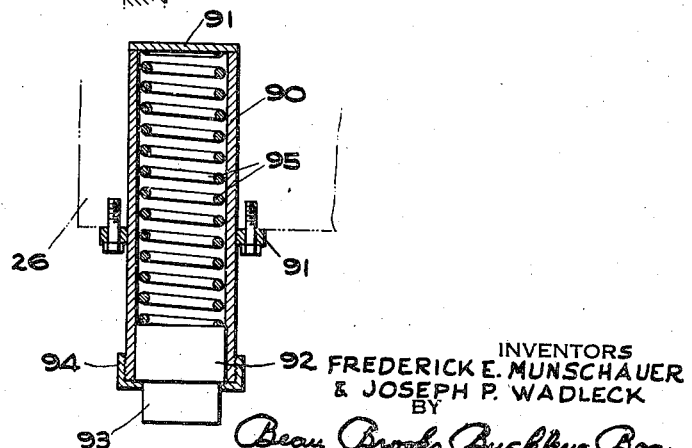
Fig. 6 is a fragmentary cross-sectional view taken on a vertical plane through an auxiliary holddown foot.

Referring again to the area in the gap provided in the left-hand frame member 10, where slitting may be performed, and with reference particularly to Figs. 1 and 6, special holddown means are provided for holding sheets being slit in the immediate vicinity of the point where the slit ends. This auxiliary holddown reciprocates directly with the crosshead 24 and the arrangement is such that it rides up and down freely and out of contact with the work table when normal full shearing cuts are being made but automatically engages and holds a sheet being slit without any adjustment or other attention on the part of the operator whenever a portion of a sheet is present in the gap of frame 10.

The auxiliary holddown for slitting is shown in detail in Fig. 6 and comprises a vertical cylindrical casing 90 which is fixed to the left-hand casting 26 of the crosshead 24 in any desired manner, as for instance by a flange 91 which is fixed to the casing 90 and is screwed to the underside of member 26. The top end of cylinder 90 is closed as at 91 and the bottom end contains a cylindrical plunger 92 which has a reduced portion 93 extending downwardly through an opening formed in an internally threaded retaining cap 94. A compression coil spring 95 normally holds the plunger 92 in the downward position illustrated in Fig. 6, and the spring 95 is preloaded to such a degree that only slight upward movement of plunger 92 upon engagement of the reduced portion 93 thereof with a work piece or sheet is required to cause the spring 95 to exert a very substantial downward holding force against the work piece.

In practice, the parts are preferably so proportioned that the lower surface of the portion 93 of plunger 92 comes down to within a few thousandths of an inch above the work table when the crosshead is in bottom dead center position. Accordingly, when sheets are not being slit in the gap in frame 10, the holddown here being described is entirely inoperative. However, if a sheet be present on the work table in the gap, the plunger 92, 93 will automatically engage against it since, in any event, in normal operation the thickness of the work sheet will be considerably greater than the normal minimum clearance between the bottom of the reduced portion 93 of plunger 92 and the top of the work table.

Means are provided within the end frame members 10 and 11 for counterbalancing the force of gravity acting upon the crosshead 24, and such means is illustrated in detail in Fig. 5. As there shown, the end member 26 of the crosshead has a rearwardly projecting bar 100 rigidly associated with it in any desired manner. A cylindrical spring housing 101 is rigidly supported by the top of the end frame member and by the vertical guide member 28 which is likewise rigidly associated with each end frame. The cylindrical spring housing likewise includes a bottom wall 102 rigidly associated with member 28.

Coaxial compression coil springs 104 and 105 reset upon bottom wall 102 and are engaged at their upper ends by a spring plate 106. A rod 107 carries a nut 108 for engaging against and exerting downward pressure on plate 106 by means of a downward pull on rod 107, and the lower end of the latter is provided with a yoke 110 having a pin 111 extending through its bifurcated lower end. The bar 100 is provided with an end notch 112 having a slight downward inclination toward its outer end, whereby it may be assembled over pin 111 and will be retained in assembly by providing sufficient initial tension in the springs. Obviously, the springs 104 and 105 are loaded during downward movement of crosshead 24 and give off a like amount of work during upward movement of the crosshead to substantially negative the downward pull of gravity on the crosshead.

Figure 9:
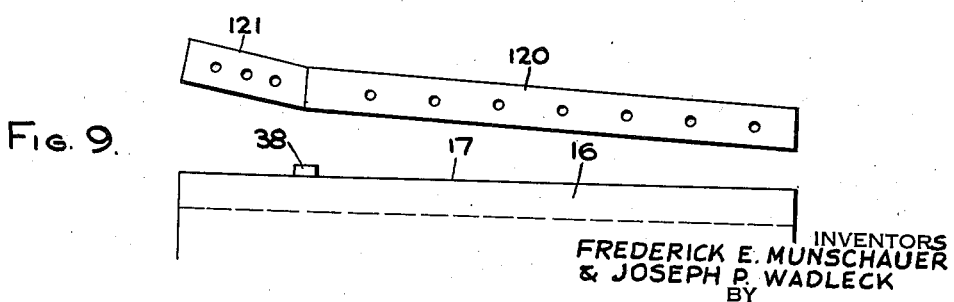
Fig. 9 is a fragmentary, somewhat schematic, front elevational view of a modified upper shear knife arrangement.

Fig. 9 shows a modified upper knife arrangement which facilitates slitting when the desired shear angle of the main shear knife is not great enough to automatically produce a slitting point within the confines of the gap in frame member 10. By way of explanation, the upper shear knife at the point adjacent the left-hand side guage 38 must come down a certain distance with respect to the lower shear knife to effect full and efficient shearing cuts. If, beginning with this point, the normal sheer angle of the lower edge of the upper shear knives is merely projected to the left as viewed in Fig. 1, it may be that the point where proper slitting could be achieved upon removal of the side gauge 38 would be to the left of the outer confines of the end frame 10. For this reason the modification of Fig. 9 provides a main shear knife 120 and an auxiliary shear knife 121 set at an accelerated shear angle with respect to the main shear knife. The auxiliary shear knife 121 is substantially coextensive in length with the width of the gap in the left-hand frame member 10. This will permit the shearing edges to be arranged in such a manner that full shearing will be clearly and certainly accomplished during normal operation of the machine, while slitting will be brought about at a predetermined point in the gap of the end frame, probably preferably midway thereof.

A further advantage of the construction of the Fig. 9 resides in the fact that shear knives 120 which are fully symmetrical and of certain standard lengths, each having square ends and four shearing edges, may still be acquired as replacement knives and may be reground in standard equipment. Regrinding of the main knives 120 need be resorted to only after all four edges require restoration. The extension slitting knives 121, since generally they are used only in a small percentage of the general run of shearing operations, will not usually need to be shifted to present a new shearing edge, at least not nearly as often as the main shear knives. At most two edges of the extension knives 120 need be used between grindings, and this may readily be accomplished despite their oblique ends.

What is claimed is:

1. In a machine for shearing metal sheets and the like, a pair of end frame means and a bed extending therebetween including a work table and a stationary shear knife fixed to the rear of said work table, each of said end frame means comprising spaced inner and outer side walls, each of said side walls being formed with a work-receiving gap extending rearwardly of said bed, drive shaft means extending across the machine above said gaps and having spaced bearing in the inner and outer side walls of each end frame, a reciprocable upper shear knife guided vertically by said end frames above said gaps and a holddown likewise guided for vertical reciprocation toward and away from said work table, eccentric means fixed to said shaft means in each end frame between said inner and outer bearings and engageable with the upper shear knife for reciprocating the same, and other eccentric means fixed to said shaft means in each end frame between said inner and outer bearings and engageable with the holddown for reciprocating the same.

2. In a machine for shearing metal sheets and the like, a pair of end frame means and a bed extending therebetween including a work table and a stationary shear knife fixed to the rear of said work table, each of said end frame means comprising spaced inner and outer side walls, each of said side walls being formed with a work-receiving gap extending rearwardly of said bed, drive shaft means extending across the machine above said gaps and having spaced bearing in the inner and outer side walls of each end frame, a reciprocable crosshead including an upper shear knife guided vertically by said end frames above said gaps and a holddown guided by said crosshead for vertical reciprocation toward and away from said work table, eccentric means fixed to said shaft means in each end frame between said inner and outer bearings and engageable with the upper shear knife for reciprocating the same, and other eccentric means fixed to said shaft means in each end frame between said inner and outer bearings and engageable with the holddown for reciprocating the same.

3. In a machine for shearing metal sheets and the like, a pair of end frame means and a bed extending therebetween including a work table and a stationary shear knife fixed to the rear of said work table, each of said end frame means comprising spaced inner and outer side walls, each of said side walls being formed with a work-receiving gap extending rearwardly of said bed, drive shaft means extending across the machine above said gaps and having spaced bearing in the inner and outer side walls of each end frame, a reciprocable crosshead including an upper shear knife guided vertically by said end frames above said gaps and a holddown, said holddown and said crosshead having complementary guide formations whereby the holddown is guided for vertical reciprocation toward and away from said work table by the crosshead, eccentric means fixed to said shaft means in each end frame between said inner and outer bearings and engageable with the upper shear knife for reciprocating the same, and other eccentric means fixed to said shaft means in each end frame between said inner and outer bearings and engageable with the holddown for reciprocating the same.

4. In a machine for shearing metal sheets and the like, a pair of end frame means and a bed extending therebetween including a work table and a stationary shear knife fixed to the rear of said work table, each of said end frame means comprising spaced inner and outer side walls, each of said side walls being formed with a work-receiving gap extending rearwardly of said bed, drive shaft means extending across the machine above said gaps and having spaced bearing in the inner and outer side walls of each end frame, a reciprocable crosshead including an upper shear knife guided vertically by said end frames above said gaps and a holddown guided by said crosshead for vertical reciprocation toward and away from said work table, eccentric means fixed to said shaft means in each end frame between said inner and outer bearings adjacent to the latter and engageable with the upper shear knife for reciprocating the same, and other eccentric means fixed to said shaft means in each end frame between the crosshead eccentric means and said inner bearing and engageable with the holddown for reciprocating the same.

5. In a machine for shearing metal sheets and the like, a pair of end frame means and a bed extending therebetween including a work table and a stationary shear knife fixed to the rear of said work table, each of said end frame means comprising spaced inner and outer side walls, each of said side walls being formed with a work-receiving gap extending rearwardly of said bed, drive shaft means extending across the machine above said gaps and having spaced bearing in the inner and outer side walls of each end frame, a reciprocable crosshead including an upper shear knife guided vertically by said end frames above said gaps and a holddown, said holddown and said crosshead having complementary guide formations whereby the holddown is guided for vertical reciprocation toward and away from said work table by the crosshead, eccentric means fixed to said shaft means in each end frame between said inner and outer bearings adjacent to the latter and engageable with the upper shear knife for reciprocating the same, and other eccentric means fixed to said shaft means in each end frame between the crosshead eccentric means and said inner bearing and engageable with the holddown for reciprocating the same.

6. In a machine for shearing metal sheets and the like, a pair of spaced upright end frame members and a bed extending therebetween and including a work table, a stationary shear knife at the rear of the work table, each of said end frame members being formed with a work-receiving gap extending rearwardly of said bed, a reciprocable upper shear knife guided by said frame members above said gaps, said shear knife having a predetermined shear angle whereby shearing of a sheet begins at one side of the machine and proceeds toward the other, the lower and upper shear knives extending substantially into the gap in the frame member at said other side of the machine and the knives being so positioned that their cutting edges intersect in the confines of said gap when the upper knife is in its lowest position during normal operation, and a removable side gauge on said work table at the inner side of said gap to normally locate work pieces for full shearing strokes, said gauge being readily removable to effect slitting with each slitting cut terminating in said gap.

7. In a machine for shearing metal sheets and the like, a pair of spaced upright end frame members and a bed extending therebetween and including a work table, a stationary shear knife at the rear of the work table, each of said end frame members being formed with a work-receiving gap extending rearwardly of said bed, a reciprocable upper shear knife guided by said frame members above said gaps, said shear knife having a predetermined shear angle whereby shearing of a sheet begins at one side of the machine and proceeds toward the other, the lower and upper shear knives extending substantially into the gap in the frame member at said other side of the machine and the knives being so positioned that their cutting edges intersect in the confines of said gap when the upper knife is in its lowest position during normal operation, and a side gauge to normally locate work pieces for full shearing strokes entirely between said frame members, said gauge being removable from gauging position to effect slitting with each slitting cut terminating in said gap.

8. In a machine for shearing metal sheets and the like, a pair of spaced upright end frame members and a bed extending therebetween and including a work table, a stationary shear knife at the rear of the work table, each of said end frame members being formed with a work-receiving gap extending rearwardly of said bed, a crosshead including a reciprocable upper shear knife guided by said frame members above said gaps, a reciprocable holddown engageable against a work sheet between said frame members, said shear knife having a predetermined shear angle whereby shearing of a sheet begins at one side of the machine and proceeds toward the other, the lower and upper shear knives extending substantially into the gap in the frame member at said other side of the machine and the knives being so positioned that their cutting edges intersect in the confines of said gap when the upper knife is in its lowest position during normal operation, a removable side gauge on said work table at the inner side of said gap to normally locate work pieces for full shearing strokes, said gauge being readily removable to effect slitting with each slitting cut terminating in said gap, and a resilient holddown element carried by said crosshead within the confines of said gap and automatically engageable against a work sheet when slitting is being effected.

9. In a machine for shearing metal sheets and the like, a pair of spaced upright end frame members and a bed extending therebetween and including a work table, a stationary shear knife at the rear of the work table, each of said end frame members being formed with a work-receiving gap extending rearwardly of said bed, a crosshead including a reciprocable upper shear knife guided by said frame members above said gaps, a reciprocable holddown engageable against a work sheet between said frame members, said shear knife having a predetermined shear angle whereby shearing of a sheet begins at one side of the machine and proceeds toward the other, the lower and upper shear knives extending substantially into the gap in the frame member at said other side of the machine and the knives being so positioned that their cutting edges intersect in the confines of said gap when the upper knife is in its lowest position during normal operation, and a removable side gauge on said work table at the inner side of said gap to normally locate work pieces for full shearing strokes, said gauge being readily removable to effect slitting with each slitting cut terminating in said gap, and resilient holddown element carried by said crosshead within the confines of said gap, the bottom of said holddown element normally just clearing the work table with the crosshead in lowermost position whereby to automatically engage against a work sheet when slitting is being performed.

10. In a machine for shearing metal sheets and the like, a pair of spaced upright end frame members and a bed extending therebetween and including a work table, stationary shear knife means at the rear of the work table, each of said end frame members being formed with a work-receiving gap extending rearwardly of said bed, reciprocable upper shear knife means guided by said frame members above said gaps, said shear knife means having a predetermined shear angle between said frame members whereby shearing of a sheet begins at one side of the machine and proceeds toward the other, the lower and upper shear knives extending substantially into the gap in the frame member at said other side of the machine and the upper shear knife means having a greater shear angle in said gap than between said frame members whereby the cutting edges intersect at a predetermined point in said gap when the upper knife is in its lowest position during normal operation, and a removable side gauge on said work table at the inner side of said gap to normally locate work pieces for full shearing strokes, said gauge being readily removable to effect slitting with each slitting cut terminating in said gap.

11. In a machine for shearing metal sheets and the like, a pair of end frame means and a bed extending therebetween including a work table and a stationary shear knife fixed to the rear of said work table, each of said end frame means comprising spaced inner and outer side walls, each of said side walls being formed with a work-receiving gap extending rearwardly of said bed, shaft means extending across the machine above said gaps and having spaced bearing in the inner and outer side walls of each end frame, a reciprocable upper shear knife guided vertically by said end frames above said gaps and a holddown guided for vertical reciprocation toward and away from said work table, eccentric means fixed to said shaft means in each end frame between said inner and outer bearings and engageable with the upper shear knife for reciprocating the same, and other eccentric means fixed to said shaft means in each end frame between said inner and outer bearings and engageable with the holddown for reciprocating the same, a driving motor secured exteriorly against the inner side wall of one of said frame means rearwardly of said shaft means with its drive shaft extending into said frame means, a transmission casing disposed exteriorly of the outer side wall of said frame means and having a pinion therein coaxial with and having a driving connection with said motor drive shaft, gear means in said transmission casing coaxial with said shaft means and having driving connection with said pinion, and clutch means in said transmission casing between said gear means and said shaft means for selectively connecting them for reciprocation of said crosshead and said holddown.

12. In a machine for shearing metal sheets and the like, a pair of end frame means and a bed extending therebetween including a work table and a stationary shear knife fixed to the rear of said work table, each of said end frame means comprising spaced inner and outer side walls, each of said side walls being formed with a work-receiving gap extending rearwardly of said bed, shaft means extending across the machine above said gaps and having spaced bearing in the inner and outer side walls of each end frame, a reciprocable crosshead including an upper shear knife guided vertically by said end frames above said gaps and a holddown guided by said crosshead for vertical reciprocation toward and away from said work table, eccentric means fixed to said shaft means in each end frame between said inner and outer bearings adjacent to the latter and engageable with the upper shear knife for reciprocating the same, and other eccentric means fixed to said shaft means in each end frame between the crosshead eccentric means and said inner bearing and engageable with the holddown for reciprocating the same, a driving motor secured exteriorly against the inner side wall of one of said frame means rearwardly of said shaft means with its drive shaft extending into said frame means, a transmission casing disposed exteriorly of the outer side wall of said frame means and having a pinion therein coaxial with and having driving connection with said motor drive shaft, gear means in said transmission casing coaxial with said shaft means and having driving connection with said pinion, and clutch means between said gear means and said shaft means for selectively connecting them for reciprocation of said crosshead and said holddown.

13. In a machine for shearing metal sheets and the like, a pair of end frame means and a bed extending therebetween including a work table and a stationary shear knife fixed to the rear of said work table, each of said end frame means comprising spaced inner and outer side walls, each of said side walls being formed with a work-receiving gap extending rearwardly of said bed, shaft means extending across the machine above said gaps and having spaced bearing in the inner and outer side walls of each end frame, a reciprocable upper shear knife guided vertically by said end frames above said gaps and a holddown guided for vertical reciprocation toward and away from said work table, drive means fixed to said shaft means in each end frame between said inner and outer bearings and engageable with the upper shear knife for reciprocating the same, and other drive means fixed to said shaft means in each end frame between said inner and outer bearings and engageable with the holddown for reciprocating the same, a driving motor secured exteriorly against the inner side wall of one of said frame means rearwardly of said shaft means with its drive shaft extending into said frame means, a transmission casing disposed exteriorly of the outer side wall of said frame means and having a pinion therein coaxial with and having driving connection with said motor drive shaft, gear means in said transmission casing coaxial with said shaft means and having driving connection with said pinion, and clutch means between said gear means and said shaft means for selectively connecting them for reciprocation of said crosshead and said holddown.

14. In a machine for shearing metal sheets and the like, a pair of end frame means and a bed extending therebetween including a work table and a stationary shear knife fixed to the rear of said work table, each of said end frame means comprising spaced inner and outer side walls, each of said side walls being formed with a work-receiving gap extending rearwardly of said bed, coaxial shaft elements having spaced bearing in the inner and outer side walls of each end frame above said gaps and each having a splined end portion projecting from the inner side wall of its supporting end frame, a torque tube internally splined at its opposite ends for engagement with the splined ends of the two shaft elements to connect them for joint rotation, a reciprocable upper shear knife guided vertically by said end frames above said gaps and a holddown likewise guided for vertical reciprocation toward and away from said work table, eccentric means fixed to each of said shaft elements in its end frame between said inner and outer bearings and engageable with the upper shear knife for reciprocating the same, and other eccentric means fixed to each of said shaft elements in each end frame between said inner and outer bearings and engageable with the holddown for reciprocating the same.

15. In a machine for shearing metal sheets and the like, a pair of end frame means and a bed extending therebetween including a work table and a stationary shear knife fixed to the rear of said work table, each of said end frame means comprising spaced inner and outer side walls, each of said side walls being formed with a work-receiving gap extending rearwardly of said bed, drive shaft means extending across the machine above said gaps and having spaced bearing in the inner and outer side walls of each end frame, a reciprocable upper shear knife guided vertically by said end frames above said gaps and a holddown guided for vertical reciprocation toward and away from said work table, drive means fixed to said shaft means in each end frame between said inner and outer bearings and engageable with the upper shear knife for reciprocating the same, and other drive means fixed to said shaft means in each end frame between said inner and outer bearings and engageable with the holddown for reciprocating the same.

FREDERICK E. MUNSCHAUER.
JOSEPH P. WADLECK.

REFERENCES CITED

The following references are of record in the file of this patent:

UNITED STATES PATENTS

| Number | Name | Date |
|---|---|---|
| 490,777 | Trethewey | Jan. 31, 1893 |
| 1,898,565 | Munschauer | Feb. 21, 1933 |
| 1,945,282 | Lindgren | Jan. 30, 1934 |
| 1,954,651 | Sherman | Apr. 10, 1934 |
| 2,064,731 | Caserta | Dec. 15, 1936 |